United States Patent [19]

Ramsey, Jr.

[11] Patent Number: 5,183,222

[45] Date of Patent: Feb. 2, 1993

[54] ELECTRIC POWERED TIP-DRIVEN FAN WITH METAL/AIR BATTERY ASSEMBLY THEREFOR

[75] Inventor: John W. Ramsey, Jr., Wichita Falls, Tex.

[73] Assignee: Tacticon Corp., Wichita Falls, Tex.

[21] Appl. No.: 743,783

[22] Filed: Aug. 12, 1991

[51] Int. Cl.$^5$ .............................................. F04B 35/04
[52] U.S. Cl. .................................... 244/53 R; 244/58; 60/203.1; 417/356; 427/27; 310/67 R
[58] Field of Search ................. 244/53 R, 57, 58, 62, 244/55, 60; 416/193 R; 60/203.1; 417/356, 423.7; 429/8, 26, 27, 30, 34, 120, 81; 310/67 R, 62

[56] References Cited

U.S. PATENT DOCUMENTS

| | | | |
|---|---|---|---|
| 1,996,295 | 4/1935 | Ferguson | 230/273 |
| 2,319,730 | 5/1943 | Garraway | 417/356 |
| 2,790,596 | 4/1957 | Stirling | 416/193 R |
| 3,143,972 | 8/1964 | Smith et al. | 417/356 |
| 3,422,275 | 6/1969 | Braikevitch et al. | 290/52 |
| 3,678,306 | 7/1972 | Garnier et al. | 417/423.7 |
| 3,708,251 | 1/1973 | Pierro | 417/356 |
| 3,861,139 | 1/1975 | Jones | 416/193 R |
| 3,899,885 | 8/1975 | Hagerty | 60/203.1 |
| 4,112,198 | 9/1978 | Przybyla et al. | 429/27 |
| 4,214,044 | 7/1980 | Chevet et al. | 429/27 |
| 4,341,847 | 7/1982 | Sammells | 429/27 |
| 4,389,466 | 6/1983 | Joy | 429/27 |
| 4,450,211 | 5/1984 | Vignaud | 429/27 |
| 4,459,087 | 7/1984 | Barge | 417/356 |
| 4,491,624 | 1/1985 | Sarbacher et al. | 429/27 |
| 4,521,497 | 6/1985 | Tamminen | 429/27 |
| 4,553,055 | 11/1985 | Auernhammer | 310/62 |
| 4,682,065 | 7/1987 | English | 310/67 R |
| 4,688,998 | 8/1987 | Olsen et al. | 417/356 |
| 4,709,882 | 12/1987 | Galbraith | 244/57 |
| 4,735,871 | 4/1988 | Descroix et al. | 429/27 |
| 4,791,035 | 12/1988 | Reichner | 429/31 |
| 4,816,352 | 3/1989 | Gordon | 429/13 |
| 4,822,698 | 4/1989 | Jackowitz et al. | 429/27 |
| 4,828,939 | 5/1989 | Turley et al. | 429/38 |
| 4,833,045 | 5/1989 | Pollack et al. | 429/30 |
| 4,871,627 | 10/1989 | Strong et al. | 429/27 |
| 4,876,163 | 10/1989 | Reichner | 429/30 |
| 4,876,678 | 10/1989 | Reichner | 429/30 |
| 4,913,983 | 4/1990 | Cheiky | 429/27 |

OTHER PUBLICATIONS

"Denver Firm Will Bid to Build Electric Cars", by Michael Booth, The Denver Business Journal, vol. 4, No. 26.
"Uniq Mobility Inc.".
"Uniq Mobilty Motor".
"Revolutionary New Motor", Fin, Mid Feb., 1988.
"Gasoline/Electric Sports Car", Popular Science, Aug. 1986.
"Uniq Mobility Inc. Research and Development Activities".
"Brushless DC Motor Control Needs No Hall Effect Sensors", Electronic Products, May 1990.
"Sensorless Spindle Motor Controller", Microlinear Publication, ML4410, Sep. 1989.
"Uniq Mobility,", Motor Trend, by Ron Grable, May 1987.
Medal.

*Primary Examiner*—Galen Barefoot
*Attorney, Agent, or Firm*—Richards, Medlock & Andrews

[57] ABSTRACT

An electrically powered engine has a tip-driven fan assembly. The engine includes an electric motor which comprise a rotor mounted on the periphery of the fan assembly and a stator mounted to the frame. Power is supplied to the electric motor by a metal/air battery assembly mounted to the frame and having a cylindrical shape. The fan assembly produces a flow of air with at least a portion of the battery assembly. The battery assembly comprises a plurality of metal/air battery cells each having a cylindrical anode, a cylindrical cathode with insulating spacers forming an annular chamber for holding the battery electrolyte.

16 Claims, 10 Drawing Sheets

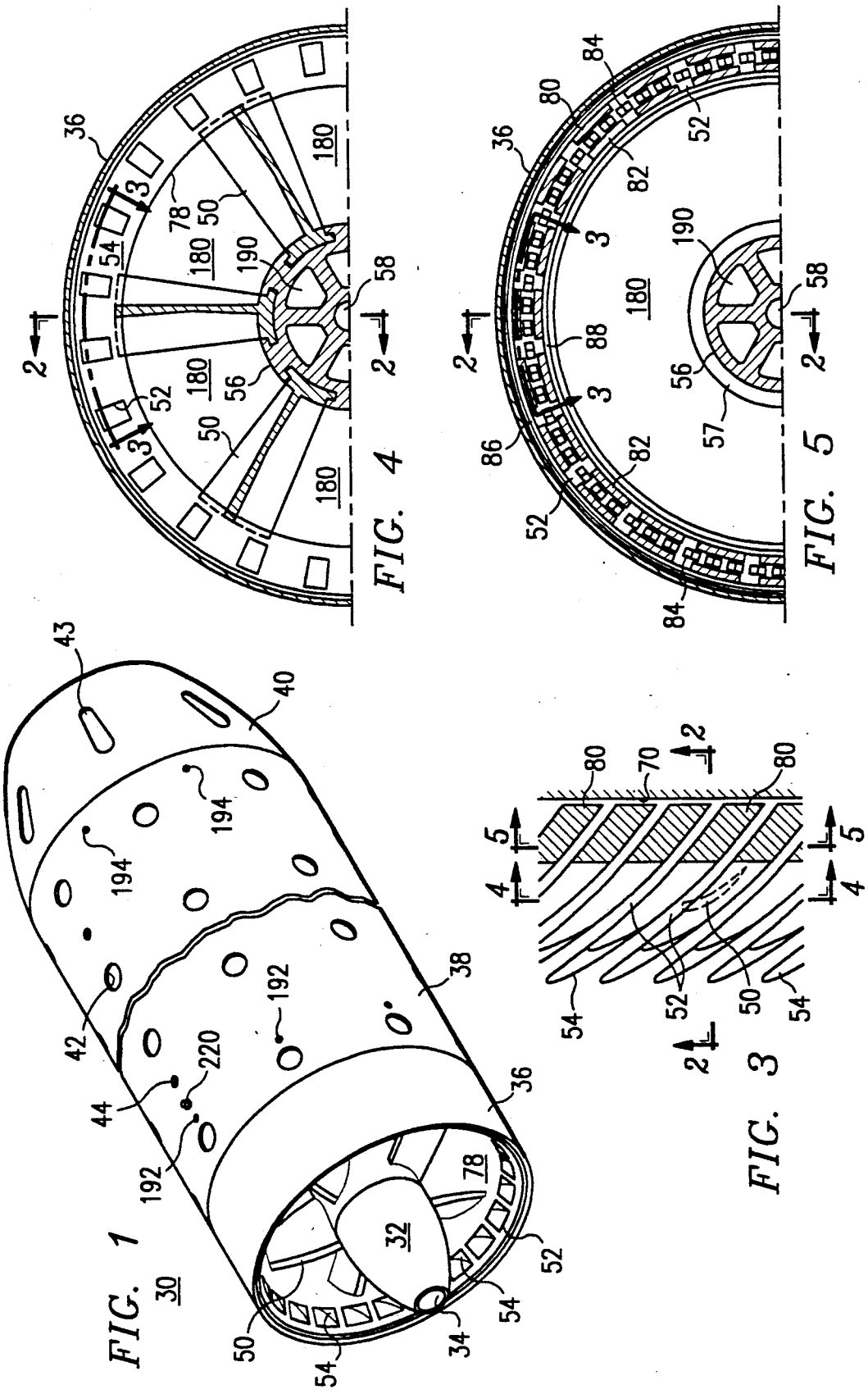

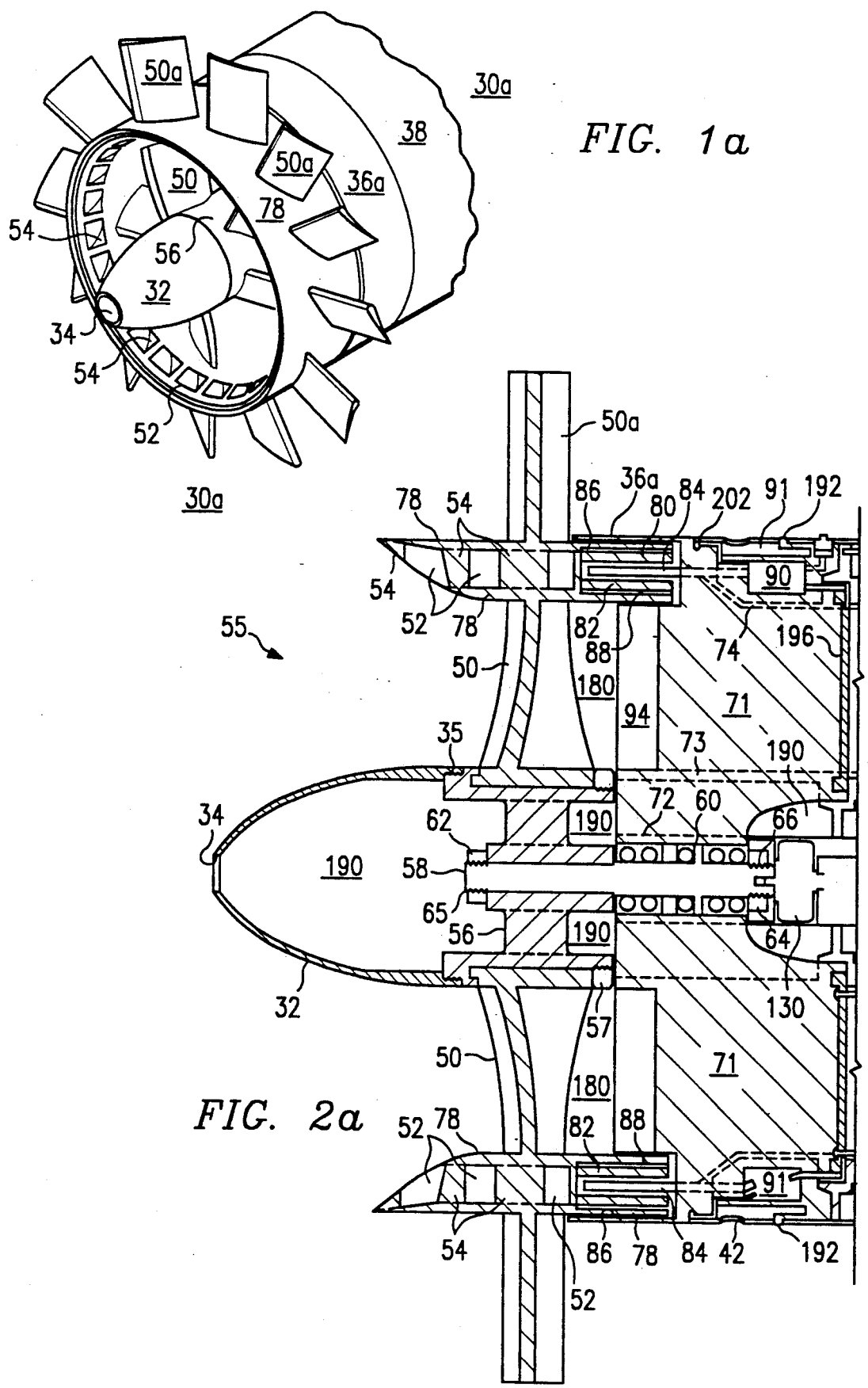

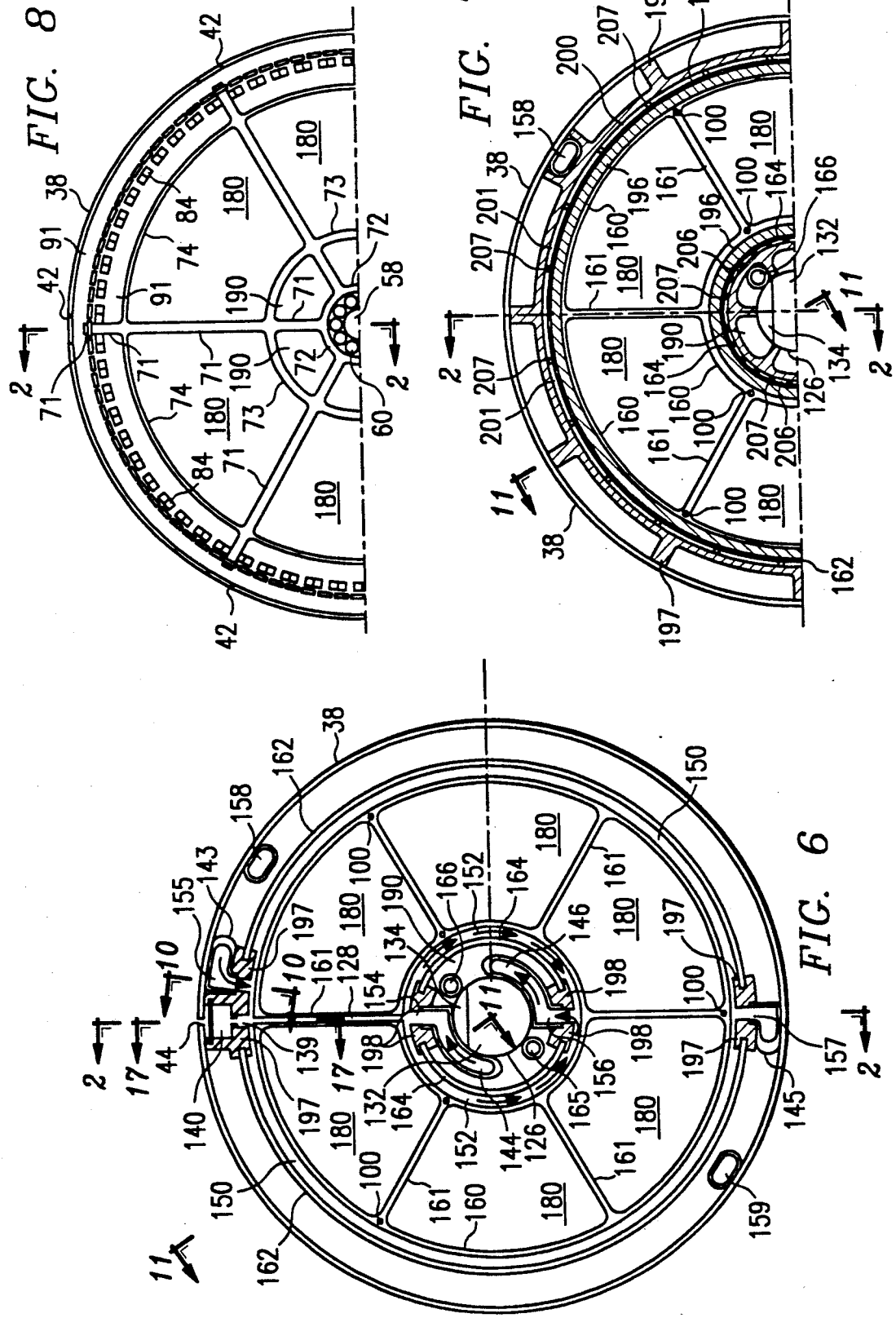

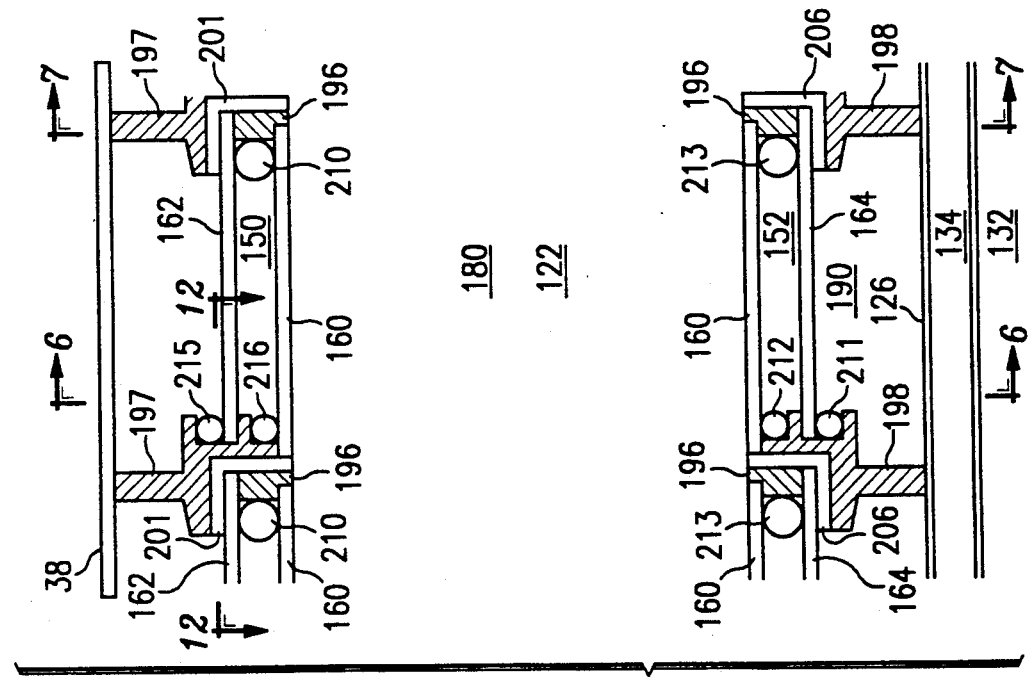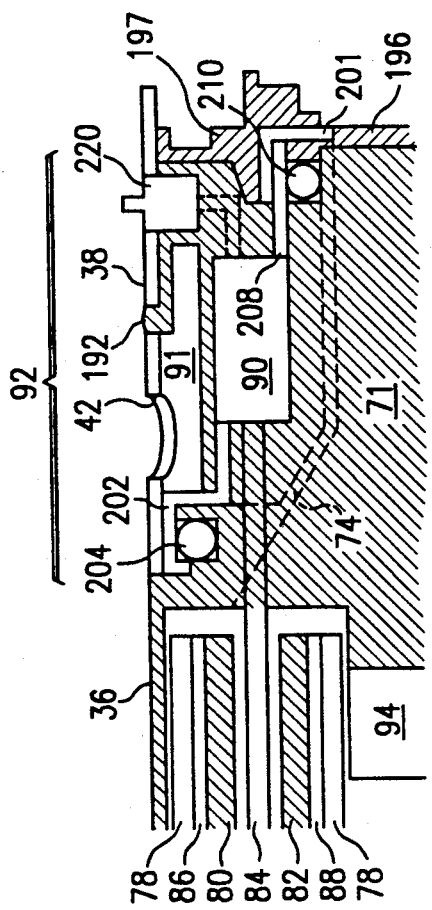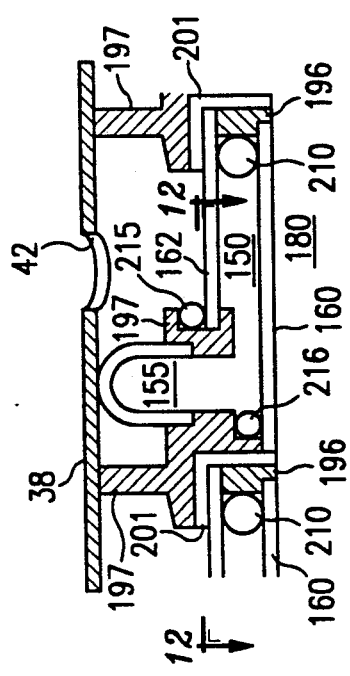
FIG. 9
FIG. 10
FIG. 11

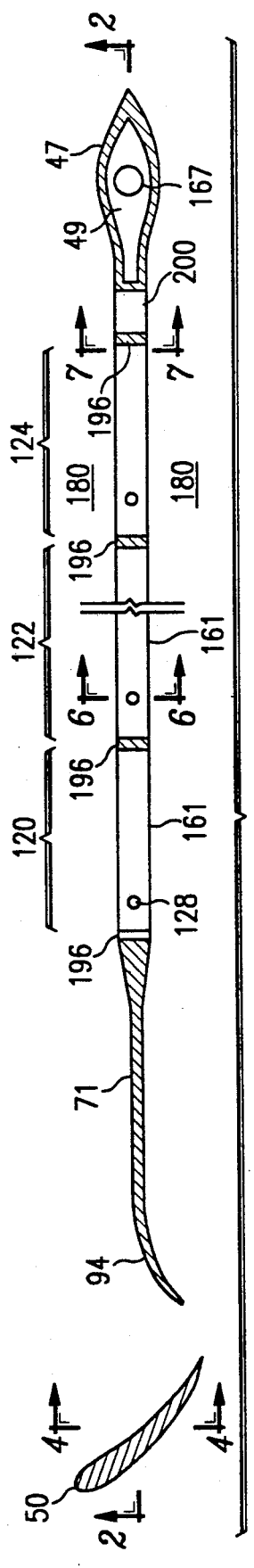
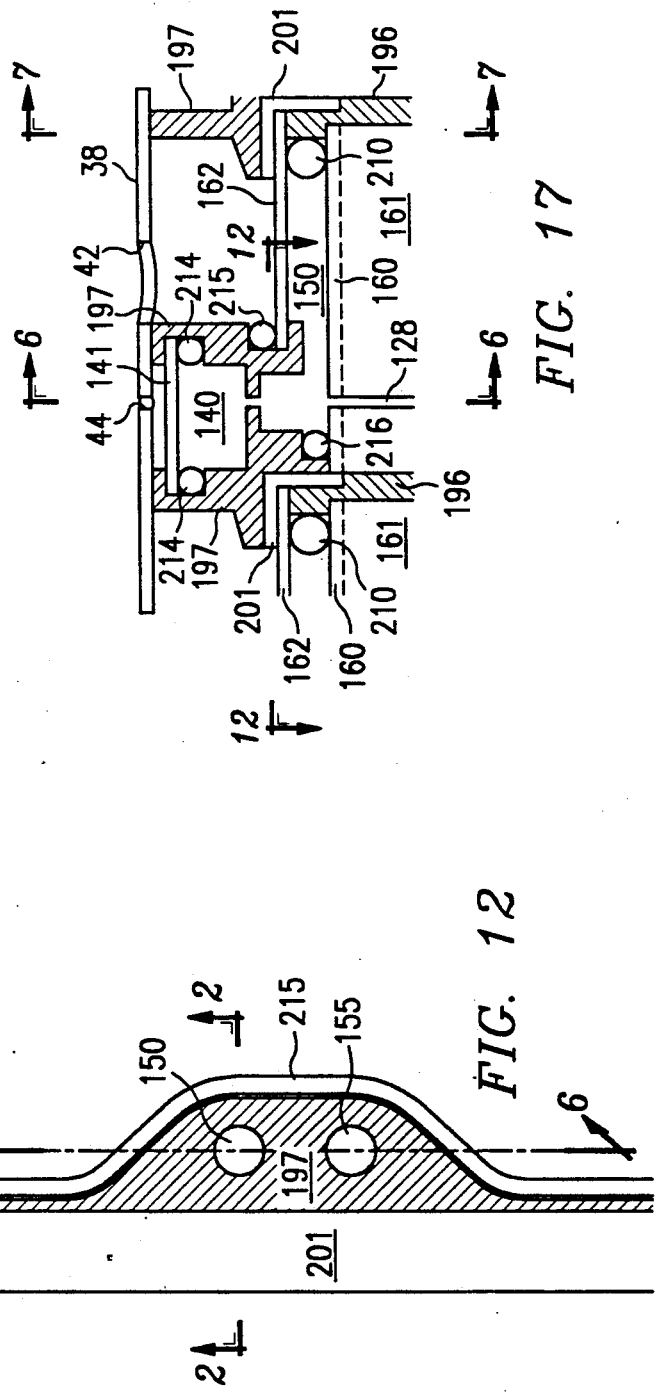
FIG. 13
FIG. 12
FIG. 17

5,183,222

ELECTRIC POWERED TIP-DRIVEN FAN WITH METAL/AIR BATTERY ASSEMBLY THEREFOR

FIELD OF THE INVENTION

The present invention relates in general to the field of turbofan power units and more specifically to such a fan which is driven by an electric motor powered by a metal/air battery assembly.

BACKGROUND OF INVENTION

Lightweight, high-power output power plants have particular application to small, unmanned aircraft, but can be applied in other fields as well. Relatively small battery powered power plants of this type have been developed and used, but such power plants suffer from lower power output and substantial weight. There are many applications, particularly in the aircraft field, where a lightweight electric power plant with a relatively high power output could be used to great advantage. Such applications include remotely piloted vehicles for reconnaissance, electronic warfare and munitions delivery.

Electrochemical or metal/air batteries can produce large quantities of power for relatively substantial periods of time. Electrochemical metal/air batteries are well known in the art, examples of which may be found in U.S. Pat. Nos. 3,378,406, 4,871,627, 3,468,711, 4,828,939 and 4,925,744, each of which is incorporated herein by reference.

In view of these requirements, there is a need for a lightweight, electrically driven turbofan engine which has a relatively small size and high power to weight ratio.

SUMMARY OF THE INVENTION

A selected embodiment of the invention is an electrically powered engine which includes a frame having a cowling joined to the frame and a fan assembly mounted by bearings to the frame. The fan assembly produces an air flow through the frame. An electric motor rotor is mounted on the fan assembly. An electric motor stator is mounted to the frame contiguous to the electric motor rotor wherein the rotor and stator comprise an electric motor for rotationally driving the fan assembly. A cylindrically shaped electrolyte battery assembly is mounted to the rear of the frame with the air flow from the fan assembly passing through openings in the frame and battery. Electrical conductors connect the battery to the electric motor stator for providing electrical power to the electric motor. The battery cowling can serve as an electrical conductor.

In a further aspect of the present invention, the electrolyte battery assembly has a cylindrical configuration and is positioned coaxially with the fan assembly.

A still further aspect of the present invention is a metal/air battery cell which has a cylindrical anode, a cylindrical cathode, and at least one insulating spacer between the anode and cathode wherein the cathode and the insulating spacer form an annular chamber for holding an electrolyte for the battery.

BRIEF DESCRIPTION OF THE DRAWINGS

For a more complete understanding of the present invention and the advantages thereof, reference is now made to the following description taken in conjunction with the accompanying drawings in which:

FIG. 1 is a perspective view of an electrically powered engine 30 in accordance with the present invention, FIG. 1a is an alternate embodiment for a turboprop configuration of the engine 30 shown in FIG. 1, FIG. 2a is a section view of an alternative embodiment for a turboprop configuration of the engine 30 shown in FIG. 1 and corresponding to that shown in FIG. 1a, FIG. 3 is a partial section view of the engine 30 in FIG. 2 taken along lines 3—3 illustrating vanes and openings, FIG. 4 is a partial section view of the engine 30 shown in FIG. 2 taken along lines 4—4, FIG. 5 is a partial section view of the engine 30 shown in FIG. 2 taken along lines 5—5, FIG. 6 is a section view of the engine 30 shown in FIG. 2 taken along lines 6—6, FIG. 7 is a partial section view of the engine 30 shown in FIG. 2 taken along lines 7—7, FIG. 8 is a partial section view illustrating the core of the engine 30 shown in FIG. 2, FIG. 9 is a detail view of the motor controller chamber of the engine 30 shown in FIG. 2, FIG. 10 is an detail view of a outer cell electrolyte inlet for the metal/air battery shown in FIG. 2, FIG. 1 is a detailed partial section view of a battery cell in the metal/air battery shown in FIGS. 6 and 7 along lines 11—11, FIG. 12 is a partial horizontal section view of a portion of a battery cell as shown in FIGS. 10, 11, and 17 along lines 12—12, FIG. 13 is a partial horizontal section view of a rotor blade, a turbine stator, a frame strut, insulating rings, anode struts, a connector ring, a tail-cone strut and a connector tube shown in FIG. 2 taken along lines 13-13, FIG. 17 is a detailed partial section view of a gas outlet for the metal/air battery of the present invention.

DETAILED DESCRIPTION

An engine 30 implemented as an aeronautical power plant, in accordance with the present invention, is illustrated generally in a perspective view in FIG. 1. This power plant is electrically powered by a replaceable metal/air battery assembly which has a very high power output per unit of weight. A principle application for the engine 30 is a power plant for a remotely piloted aircraft, which could advantageously be used for military applications.

Figure 2:
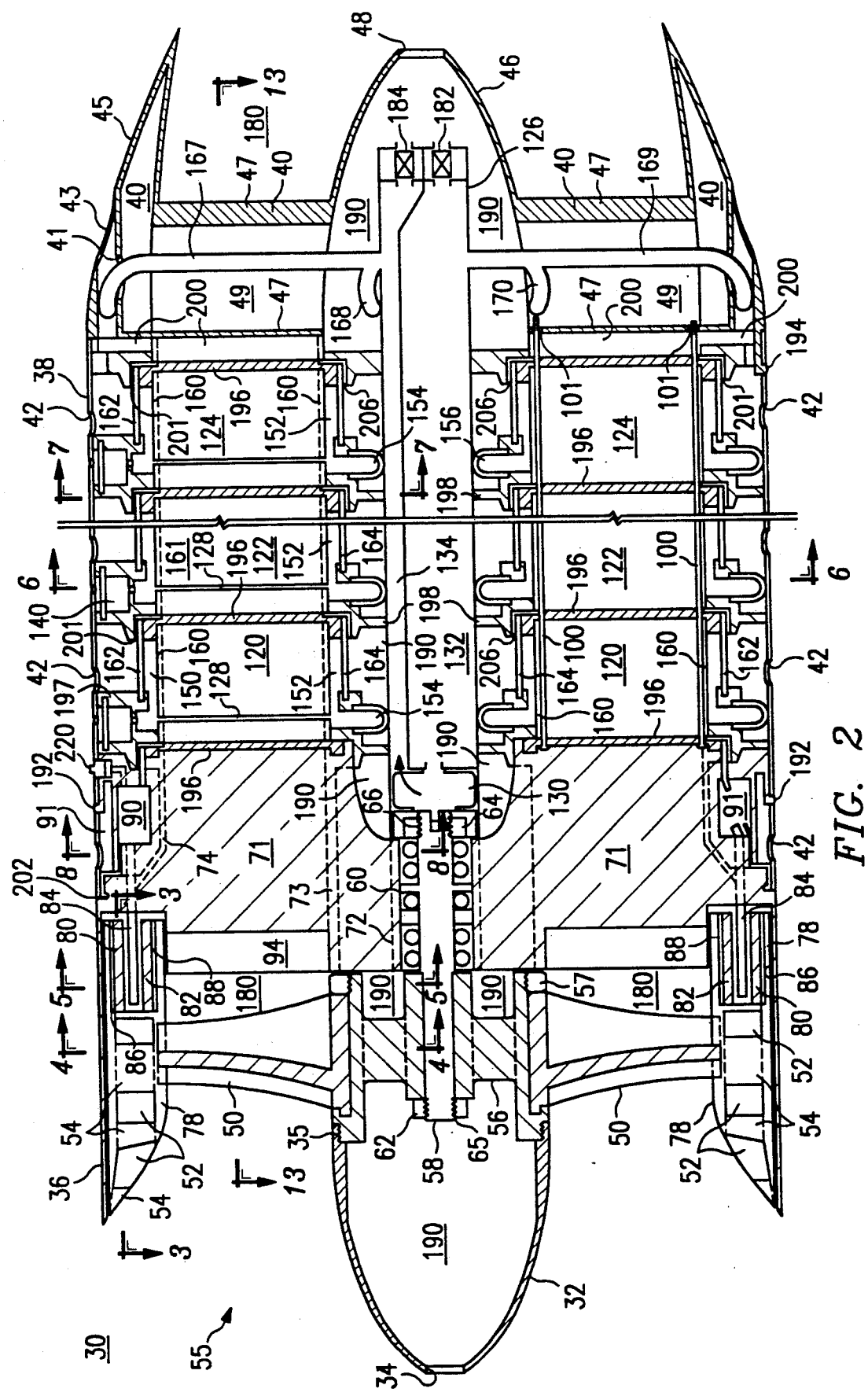
FIG. 2 is a section and partially schematic view of the engine 30 shown in FIG. 1.

Referring now to FIGS. 1 and 2, the electrically powered tip-driven engine 30 is shown in a perspective view in FIG. 1 and in a section view in FIG. 2. In a selected embodiment, the engine 30 preferably has a diameter of 7 to 8 inches and a length of approximately 24–30 inches, when equipped with twenty battery cells, as described herein. The principle parts of the engine 30 are a rotor assembly 55, an electronic motor controller assembly 92, a frame assembly 70, a battery assembly 175, a battery cowling 38, a tail cone 40 and an electrolyte circulating system 135.

Each of the assemblies and systems are described below in detail.

Rotor Assembly 55

The engine 30 is provided with a rotor assembly 55 which drives air through the engine 30 to provide propulsion as well as cooling. Rotor assembly 55 includes rotor blades 50, a hub 56, a shaft 58, nuts 62 and 64, a nose cone 32, a housing 78, vanes 54, iron sleeves 86 and 88 and sets of magnets 80 and 82.

As shown in FIG. 2, each of the blades 50 is secured to hub 56 which is in turn mounted on shaft 58. See FIGS. 4 and 5 for detail views. Nose cone 32 is secured to hub 56 by threads 35. Shaft 58 is journaled by bearings 60. Nut 62 secures the hub 56 to shaft 58 by threads 65. Nut 64 secures the shaft 58 and hub 56 to bearings 60 and a frame assembly 70 by threads 66. The rotor blades 50 extend radially outwards from the hub 56. Each of the rotor blades, as shown in FIG. 4, is mounted within the T-shaped groove in the hub 56 and secured in place to the hub 56 by a nut 57. See FIG. 4.

An annular housing 78 is mounted on the outer ends of blade 50. See FIGS. 1 and 2. Housing 78 includes the openings 52 and vanes 54 therein as shown in FIGS. 3, 4 and 5. The housing 78 is mounted to and therefore rotates with the blades 50 and hub 56. Concentric iron sleeves 86 and 88 are mounted within the housing 78. Fixed to the inner surfaces of respective sleeves 86 and 88 are sets of magnets 80 and 82. The sets of magnets 80 and 82 consist of individual magnets positioned behind respective vanes 54 in a manner that allows the openings between individual magnets to extend the rectangular openings 52 present between vanes 54 to the rear edge of annular housing 78. These magnets comprise a portion of the rotor assembly for an electric motor.

An electrical stator 84 comprises a cylindrical element which is mounted to the frame assembly 70 and extends between the sets of magnets 80 and 82. Stator 84 includes coil windings which receive electrical power and function in conjunction with magnets 80 and 82 to form an electric motor which drives the housing 78 and thereby causes the blades 50 and the hub 56 to rotate. A commercially available motor assembly of this type is a Model UNIQ manufactured by Unique Mobility, Inc. (Englewood, Colorado). This is a brushless, direct current motor. As shown in the schematic illustration in FIG. 14, the rotation of the vanes 54 moves air rearward through openings 52, over, under and through stator 84 and then exiting to the rear of annular housing 78. Thereafter, such air joins the air forced rearward by rotor blades 50 and passes into turbine chamber 180 in frame assembly 70 and then into the extension of chamber 180 into the battery assembly 175. Stator 84 is cooled by the rearward flow of air through annular housing 78.

Although shown as separate components, hub 56, blades 50, housing 78 and vanes 54 can be fabricated as an integral assembly.

Frame Assembly 70

As shown in FIGS. 2, 8 and 13, the frame assembly 70 includes a bearing housing 72, bearings 60, sleeves 73 and 74, motor cowling 36, a central chamber 190, turbine chamber 110, motor controller chamber 91, struts 71, a turbine stator 94, an electrical motor stator 84 and locking tabs 192. Frame assembly 70 includes a series of concentric sleeves (bearing housing 72, sleeve 73, sleeve 74 and motor cowling 36) connected by struts 71 forming a series of cylindrical chambers 190, 180, and 91. Bearing housing 72 and sleeve 73 form the inner and outer surfaces of chamber 190 which extends from opening 34 in nose cone 32 through hub 56, frame assembly 70, battery assembly 175 and tail cone 40 to opening 48. Sleeves 73 and 74 provide the inner and outer surfaces of turbine chamber 180 through which flows air forced rearward by blades 50 and vanes 54. Chamber 180 extends rearward from blades 50 through frame assembly 70, battery assembly 175 and tail cone 40. Sleeve 74 also provides a floor for motor controller chamber 91 and deflects air exiting housing 78 into chamber 180. Motor cowling 36 extends forward from motor controller chamber 91 enclosing annular housing 78. The curved leading edge of frame strut 71 forms turbine stator 94 which straightens the rearward flow of air and aligns the flow with the central axis of engine 30. Electrical motor stator 84 is mounted to the forward part of frame assembly 70 that comprises the controller chamber 91 and extends forward between sets of magnets 80 and 82 of the rotor assembly. Rotor assembly 55 is connected to the front of frame assembly 70 by shaft 58, and battery assembly 175 is held in contact with the rear of frame assembly 70 by battery cowling 38 and tail cone 40. Battery cowling 38 is secured to the rear of frame assembly 70 by locking tab 192.

Motor Controller Assembly 92

The electric motor controller assembly 92 includes the electronic power controller 90, O-ring 204, electrically conductive connector tab 202, O-ring 210, electrically conductive tab 208, and control system interface 220. See also FIG. 9.

Figure 16:
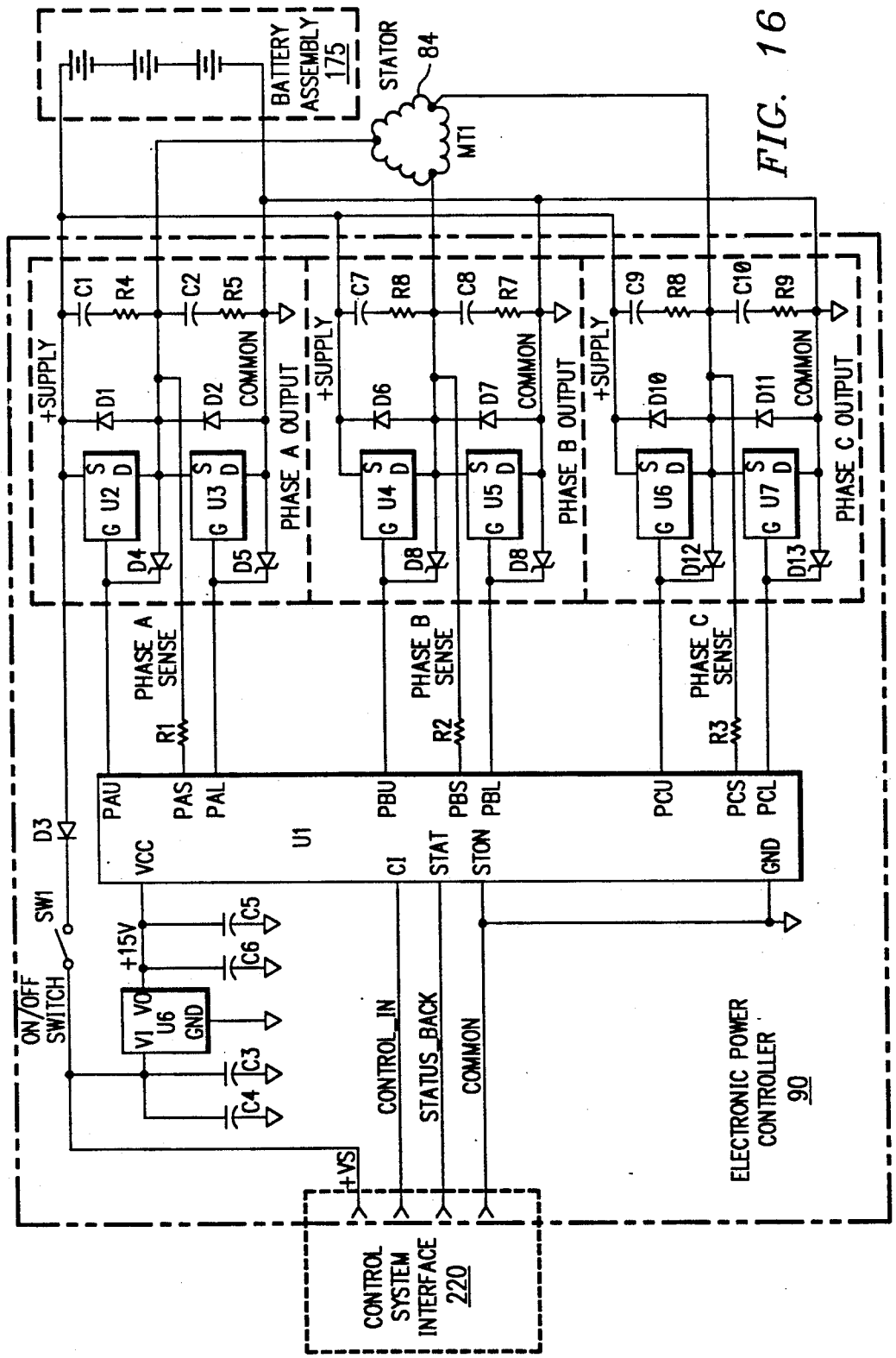
FIG. 16 is an electrical diagram for the motor control circuitry of the present invention.

Electronic power controller 90 comprises a module of electronic components, such as Micro Linear Corporation's ML4410 Sensorless Spindle Motor Controller (as described in "Advanced Information," p. 4–96, Sep., 1989), which provide conditioned electrical power to stator 84 for driving the electric motor which comprises stator 84 and permanent magnets 80 and 82. A typical schematic for an electronic controller 90 is described in further detail in FIG. 16. As shown diagrammatically in FIGS. 2 and 9, electric current passes from the battery assembly 175 through connector ring 201 to connector tab 208 which is held firmly in contact with connector ring 201 by the compression of O-ring 210. Electric current passes from connector tab 208 to controller 90 where the current is conditioned and passed to motor stator 84 and then back to controller 90. Electric current passes from controller 90 to connector tab 202 which is held in contact with battery cowling 38 by O-ring 204. Electric current then returns to the battery through battery cowling 38 completing the electrical circuit. The battery cell structure and operation is further described below. The electric power controller is operated by signals passed from a remote ground station through a fiber optic connection or by radio transmissions to control system interface 220.

Battery Assembly 175

Three cells 120, 122, 124 are shown in engine 30 described herein. See FIGS. 1, 2, 6, 7, 9, 10, 11, 12, 17 and 18. The battery assembly 175 may consist of any number of identical battery cells, such as 122, stacked in series with adjoining cells separated by similar insulating and conducting rings. Each battery cell includes an anode 160, an outer cathode 162, an inner cathode 164, insulating rings 196, 197 and 198, connector rings 201 and 206, O-rings 210, 211, 212,, 213, 214, 215 and 216, an outer electrolyte chamber 150, an inner electrolyte chamber 152, a filter 141 which passes gas but not the fluid electrolyte, a gas chamber 140, and a gas vent 128. Additionally, the battery assembly includes assembly bolts 100, nuts 101 and a single connector ring 200. The outer cathode 162 is made, for example, of Kevlar (tm) with an impressed stainless steel mesh. The inner cathode 164 is preferably aluminum. A sample material for the filter 141 is identified by the trademark MEDAL (tm) which is a material made and sold by DuPont. This material operates on the principle of selective permeation.

As shown in FIG. 11, the cathode 162 is pressed in contact with the connector ring 201 by the O-ring 210. The stainless steel mesh of cathode 162 contacts the surface of ring 201. The mesh, together with the pressure of contact, produces a low resistance electrical connection between the cathode 162 and the connector ring 201. This is particularly important due to the relatively low voltage produced by each of the battery cells.

In the preferred application, the engine 30 is equipped with approximately twenty battery cells, such as cell 122, as shown in FIGS. 2, 6, 11, 12, 15 and 17. These batteries are connected in series to provide electrical power to controller 90 which in turn provides regulated power to stator 84 for driving the motor comprising stator 84 taken in conjunction with magnets 80 and 82. Battery cells 120, 122 and 124 are located aft of the frame assembly 70, are enclosed in battery cowling 38 and held in position by tail cone 40. Each of these battery cells is identical to the others so only battery cell 122 will be described in detail.

Each battery cell 122 is constructed about a single anode, composed of a material such as aluminum, that consists of two cylindrical sleeves joined by multiple struts. Anode 160 is common to two cathodes 162 and 164 and two electrolyte chambers 150 and 152. A sample material for the cathodes 162 and 164 is Gas Diffusion Electrode AE-20 manufactured by Eltech Systems Corporation. Outer electrolyte chamber 150 and outer cathode 162 are located radially about the outside of the outer cylindrical sleeve of anode 160. Inner electrolyte chamber 152 and inner cathode 164 are located on the inside of the inner cylindrical sleeve of anode 160. Insulating ring 196 which is composed of non-conducting material, separates and insulates each anode 160 from anodes 160 of adjoining battery cells 120 and 124. Insulating ring 197, which is composed of an electrically insulating material, provides a frame in which outer cathode 162 is fixed and includes at the top of the ring the gas outlet chamber 140 and electrolyte inlet 155 and at the bottom of the ring electrolyte outlet 157 as shown in FIGS. 2, 6, 11, 12, 15, 17 and 18. Insulating ring 198, which is also composed of a non-conducting material, provides a frame in which inner cathode 164 is fixed and includes at the top of the ring electrolyte outlet 154 and at the bottom of the ring electrolyte outlet 156. The compression of O-rings 210, 211, 212, 213, 215 and 216 seals the electrolytic material in electrolyte chambers 150 and 152. Additionally, the compression of O-rings 210 and 213 presses connector rings 201 and 206 to the surfaces of cathodes 164 and 162, respectively, insuring good electrical contact. That part of the connector rings 201 and 206 lying in contact with cathodes 162 and 164 contain slots 207 that provide the connector rings with flexibility, as shown in FIG. 7.

The cells of the battery assembly 175 are held together as a single unit by nonconducting bolts 100 and nuts 101 extending from insulating ring 196 at the forward edge of cell 120 through holes in anodes 160 of each battery cell to the rear edge of connector ring 200. The battery cells are connected to each other in series by connector rings 201 and 206. For example, connector ring 201 connects anode 160 of battery cell 122 to cathode 162 of battery cell 120. Connector ring 201 is held firmly in contact with cathode 162 by the compression of O-ring 210. Similarly, connector ring 206 connects anode 160 of battery cell 122 to cathode 164 of battery cell 120. Connector ring 206 is held in contact with cathode 164 by the compression of O-ring 213.

During operation of the battery, electrolyte chambers 150 and 152 are filled with an electrolytic material such as, for example, potassium hydroxide. Various types of electrolytes are described in the metal/air patents incorporated above by reference. Electrical current is produced in battery cell 122 when oxygen passes through cathodes 162 and 164 to react with the electrolyte present in electrolyte chambers 150 and 152 and the electrolyte then oxidizes anode 160. During operation of the battery, some gas is generated in the electrolyte. The buoyancy of such gas will move it to the top of electrolyte chambers 150 and 152. Such gas generated in chamber 152 will pass up through vent 128 in strut 161 of anode 160 to chamber 150 where the gas will join with gas generated in chamber 150 and pass into gas chamber 140 as shown in FIGS. 2, 6 and 17. The gas will then pass from chamber 140 through the gas-only passing filter 141 and through vent opening 44. O-ring 214 holds filter 141 in position and prevents leakage of electrolyte. Electric current produced by the battery drives the electric motor of engine 30.

Figure 18:
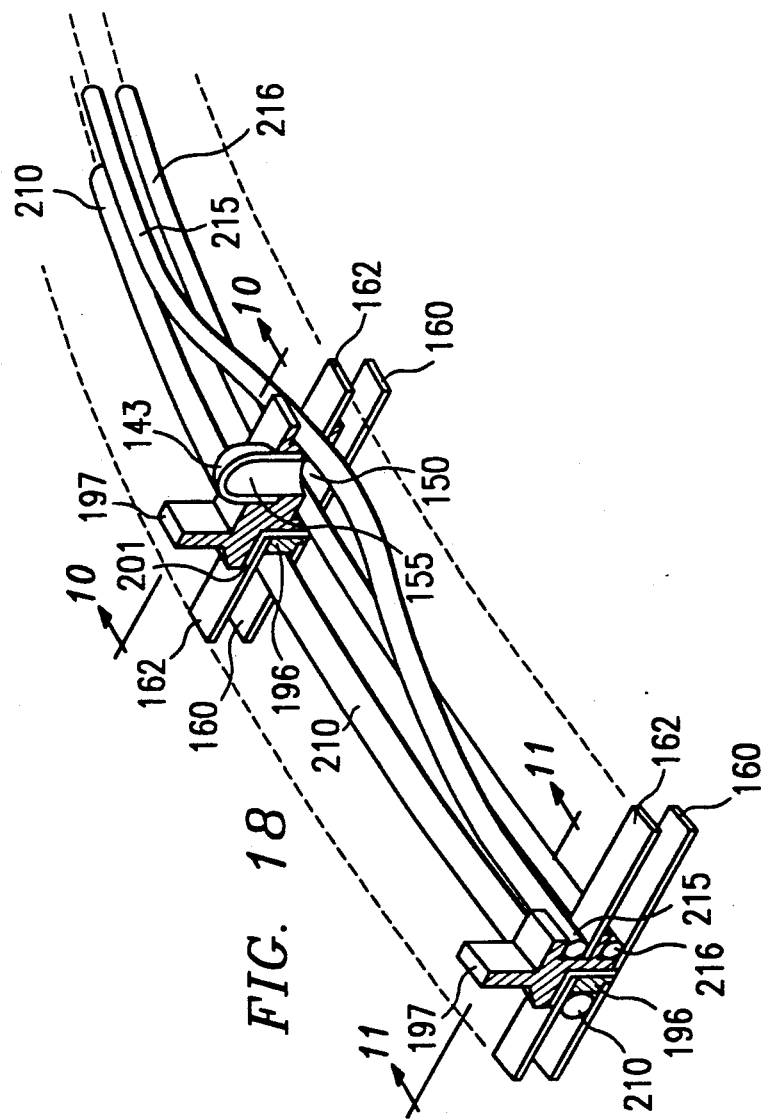
FIG. 18 is a combination partial perspective and partial section of a portion of the metal/air battery showing the routing of O-rings around the electrolyte inlet.

FIGS. 10, 11, 12, 17 and 18 illustrate a novel design that provides openings of ingress and egress for electrolyte in the electrolyte chambers of the battery cells. Electrolyte inlet 155, which is located at the top of insulating ring 197, serves electrolyte chamber 150 and is typical of the openings to the electrolyte chambers of the other cells of the battery assembly 175 described herein. The compression of O-ring 216 prevents leakage of electrolyte between insulating ring 197 and anode 160. Similarly, O-ring 215 prevents leakage of electrolyte between insulating ring 197 and cathode 162. The part of the top of insulating ring 197 that extends above O-ring 216 widens laterally to allow space for openings (electrolyte inlet 155 and gas chamber 140) to extend from the outer surface of insulating ring 197 inward to electrolyte chamber 150. Except in the vicinity of openings into the electrolyte chambers, O-ring 215 is located directly above O-ring 216 as shown in FIGS. 11 and 18. In the vicinity of the openings into the electrolyte chambers, O-ring 215 follows the upper laterally widened part of insulating ring 197 as shown in FIGS. 10, 12, 17 and 18 thereby allowing openings to chamber 150 through the outer surface of the battery cell. A similar widened area at the bottom of insulating ring 197 provides space for electrolyte outlet 157 as shown in FIG. 6.

Referring to FIG. 18, there is shown a perspective view which illustrates the routing of the O-ring 215 around electrolyte inlet 155.

Battery Cowling 38

Figure 14:
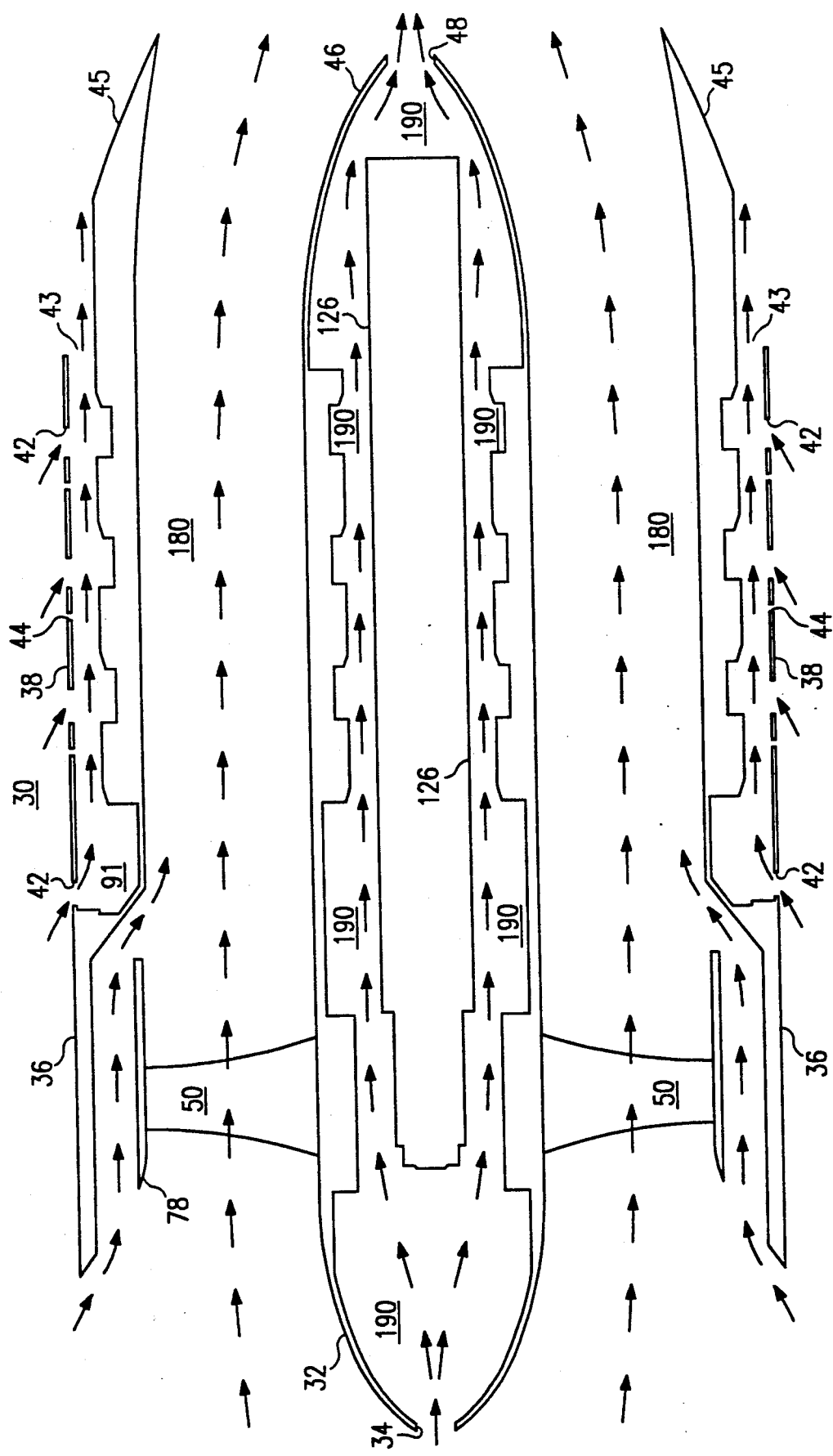
FIG. 14 is a schematic diagram of the air flow through the engine 30 shown in FIG. 2.

Battery cowling 38 comprises an electrical conducting sleeve that is fixed to frame assembly 70 by multiple locking tabs 192 as shown in FIG. 2. Battery cowling 38 provides a receptor for the battery assembly 175, provides an electrical link between electronic power controller 90 and battery assembly 175 and provides a base for attachment of tail cone 40. Openings 44 (FIG. 17) allow gases produced by the battery assembly 175 to exit engine 30. Openings 42 (FIGS. 1, 2 and 10) allow ambient air to enter battery cowling 38, pass through openings in insulator rings 197, between battery cowling 38 and cathodes 162, through opening in connector ring 200 and exit through opening 43 in tail cone 40. Such air movement provides oxygen necessary for the operation of battery cells 120, 122, 124 and removes heat from the battery assembly. FIG. 14 illustrates the flow of air through the engine 30.

Tail Cone

Tail cone 40 is a single piece of plastic molded to form outer cowling 45, interior cowling 46, tail cone struts 47 and locking tabs 194. Tail cone 40 reduces the drag of ambient air which passes the exterior of engine 30 and the high velocity air which passes through engine 30 and exits between outer cowling 45 and interior cowling 46. Openings 43 allow ambient air passing rearward through the annulus between battery cowling 38 and cathodes 162 to exit engine 30. Opening 48 allows ambient air entering opening 34 in nose cone 32 to exit engine 30, as illustrated in FIG. 14. Outer cowling 45 and interior cowling 46 are joined by two struts 47 with an internal chamber 49 that connects the interior chambers of the outer cowling 45 and the interior cowling 46 as shown in FIG. 2. Chamber 49 provides a passageway through which connector tubes 167 and 169 pass to allow electrolyte to be circulated from an electrolyte reservoir 126 to outer electrolyte chambers 150. Tail cone 40 is attached to battery cowling 38 by multiple locking tabs 194.

Electrolyte Circulating System 135

Figure 15:
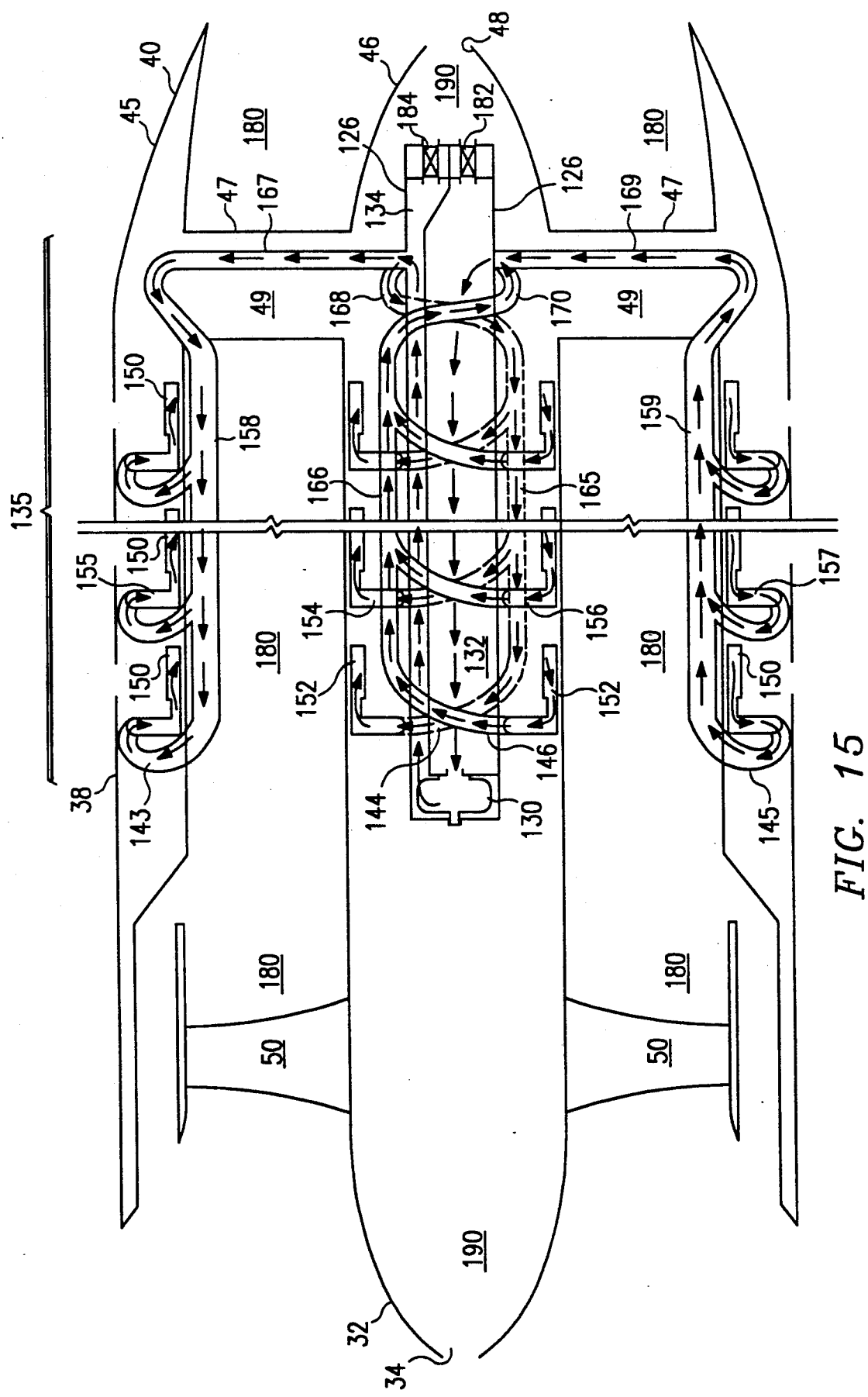
FIG. 15 is a schematic diagram of the electrolyte flow path through the metal/air batteries.

The electrolyte circulating system 135 as shown schematically in FIGS. 2 and 15 consists of electrolyte reservoir 126, pump 130, manifold connector tubes 167, 168, 169 and 170, manifolds 158, 159, 165 and 166, inlet connector tubes 143 and 144, outlet connector tubes 145 and 146, reservoir inlet valve 182 and reservoir overflow valve 184.

For short runs of 30 minutes or less, such as a non-retrievable weapon system, engine 30 can operate without the electrolyte circulating system 135 and can operate with the electrolyte present only in electrolyte chambers 150 and 152. Operation without the electrolyte circulating system substantially reduces the weight of engine 30.

For extended periods of operation, electrolyte circulating system 135 shown in FIG. 15 increases the amount of electrolyte available and allows the sludge resulting from the oxidation of anode 160 to be precipitated and trapped in reservoir 132 thereby increasing the efficiency of the electrolyte and the operating time of the engine 30. The circulation of the electrolyte also helps remove heat from the battery.

The metal/air battery is activated upon filling with electrolyte, consequently, electrolyte is only introduced to the electrolyte chambers when the use of engine 30 is imminent. The electrolyte circulating system is filled through reservoir inlet valve 182, and excess electrolyte is removed through reservoir overflow valve 184.

In operation the electrolyte is circulated simultaneously through outer electrolyte chamber 150 and inner electrolyte chamber 152. As shown in FIG. 15 pump 130 which is engaged to the end of shaft 58 circulates electrolyte from chamber 132 of reservoir 126 into chamber 134 from which the electrolyte flows into electrolyte connector tubes 167 and 168 which serve electrolyte chambers 150 and 152, respectively. The electrolyte then flows from tube 167 to electrolyte manifold 158 which distributes electrolyte through inlet connector tubes 143 to the electrolyte inlets 155 at the top of outer electrolyte chambers 150. Similarly, electrolyte flows from connector tube 168 to manifold 165 which distributes electrolyte through inlet connector tubes 144 to the electrolyte inlets 154 and 156 at the top of the inner electrolyte chambers 152. The electrolyte circulates from the top to the bottom of electrolyte chambers 150 and 152 and returns to electrolyte chamber 132 of electrolyte reservoir 126 by exiting chambers 150 and 152 through electrolyte outlets 157 at the bottom of chambers 150 and electrolyte outlets 156 at the bottom of chambers 152. The electrolyte passes through outlet connector tubes 145 and 146 to manifolds 159 and 166 and returns through connector tubes 169 and 170 to reservoir 126.

Cooling Systems

The metal/air battery described herein can produce substantial quantities of electric power for periods of time in the range of hours, and in doing so the battery generates tremendous amounts of heat. The load that can be placed on the battery, and consequently, the amount of power produced is limited by the efficiency with which that heat is removed. The electric motor designed herein is also capable of producing substantial quantities of power and heat, and similarly, the level of power is also limited by the efficiency with which that heat is removed. Engine 30 is designed to maximize the removal of heat from the battery and the electric motor by using both the high velocity air produced by the turbine and by the slower velocity ambient air available during operation of engine 30 thereby enabling both the motor and battery to operate at a high level of power output without overheating. No known design of either of these systems has been able to deliver a sustained high level of power without overheating.

Heat produced in engine 30 is generated principally in stator 84, power controller 90 and at the interface between the electrolyte and anode 160. Such heat is largely removed from engine 30 by the high velocity air produced by rotor blades 50 and vanes 54. Air is drawn through openings 52 in annular housing 78 of the rotor assembly and forced rearward by vanes 54. Such air cools stator 84 by passing over, under and between the conductors composing stator 84 and then to join in frame assembly 70 air forced rearward by blades 50. These combined streams of air flow rearward through chamber 180 along the inner facing metal surfaces and struts of anodes 160 of battery cells 120, 122, 124 cooling the anode side of these cells. Anode 160, which is composed of a metal such as aluminum, is highly conductive of heat facilitating the removal of heat from the battery.

During the operation of engine 30 in its preferred application as a power plant for small aircraft, additional cooling is provided by the flow of ambient air through openings in nose cone 32 and battery cowling 38. The flow of air is shown diagrammatically in FIG. 14. Ambient air entering openings 42 in battery cowling 38, passes between cowling 38 and outer cathodes 162 exiting through opening 43 in tail cone 40 cooling electronic power controllers 90, outer cathodes 162, inlet tubes 143, outlet tubes 145, manifolds 158 and 159 and a part of connector tubes 167 and 169 as shown in FIGS. 2, 6, 14, and 15. Also during operation of engine 30 ambient air enters chamber 190 through opening 34 in nose cone 32, passes through openings in hub 56 and frame assembly 70, passes into the annulus between cathodes 152 and electrolyte reservoir 126 exiting through opening 48 in tail cone 40 cooling bearings 60, inner cathodes 164, electrolyte reservoir 126, inlet tubes 144, outlet tubes 146, manifolds 165 and 166 and connector tubes 168 and 170. Engine 30 can be operated in a stationary condition at lower power levels without overheating, but to preclude overheating at a higher power level it must have forward motion to allow air to flow through openings 34 and 42.

Electrical Circuit

In its preferred embodiment the metal/air battery system of engine 30 is composed of twenty individual battery cells connected in series and producing direct current. The voltage of each cell is relatively low and the current of each is relatively high.

In a completed circuit, current flows from anode 160 of battery cell 120 at the forward end of battery assembly 175 to electronic power controllers 90 by way of connector ring 201 and connector tab 208. The current is conditioned in controllers 90, passed to stator 84 and back to controllers 90. The current then flows from controllers 90 through connector tab 202 to battery cowling 38 and then to connector ring 200 at the rear of battery assembly 175. Current then flows from connector ring 200 to connector rings 201 and 206 at the rear edge of battery cell 124. The current then flows from connector rings 201 and 206 to cathodes 162 and 164 of battery cell 124, respectively, completing the electrical circuit. Connector rings 201 and 206 encircle each battery cell in continuous contact with anode 160 providing a continuous, very low-resistance, electrical connection. Pressure is maintained on the connection by bolts 100. A secure low-resistance, electrical connection between connector rings 201 and 206 and cathodes 162 and 164 is provided by a large, continuous area of contact between connector rings and cathodes. Pressure is maintained on the electrical connection by the compression of O-rings 210 and 213. Similarly, large, firm electrical connections are maintained by compressed O-rings between connector tab 208 and connector ring 206 and between connector tab 202 and battery cowling 38. Connector ring 200 is in firm contact with battery cowling 38 at several points around the inside of battery cowling 38.

Modularity

A particularly advantageous aspect of the present invention is the method of assembly and replacement of battery assembly 175 in engine 30. Referring to FIG. 2, engine 30 can use any number of metal/air battery cells, such as cell 122. All of the cells are identical and a plurality of such cells can be stacked together to produce the desired voltage and are fixed together as a single replaceable battery. Depleted batteries are replaced by releasing locking tabs 194, disconnecting connector tubes 167, 168, 169 and 170 from manifolds 158, 159, 165 and 166, removing tail cone 40 and sliding out the depleted battery. When a battery is removed, connector ring 201 located on the forward edge of battery cell 120 slides out its contact with connector tab 208 and electrolyte pump 130 disconnects from shaft 58. Each replacement battery includes a new electrolyte reservoir 126, connector tubes and manifolds and is replaced by reversing the order of disassembly.

The rotor assembly 55, frame assembly 70, battery cowling 38, battery assembly 175 and tail cone 40 are constructed as individual units and are interchangeable from one engine 30 to another.

Turboprops Embodiment

An alternative embodiment of the rotor assembly 55 of the engine 30 is illustrated as engine 30a in FIGS. 1a and 2a. The engine 30a has blades 50a which are a part of and extend beyond housing 78. Cowling 36a extends forward to the rear of blades 50a. Otherwise, the rotor assembly 55a of the engine 30a is essentially the same as the rotor assembly 55 of the previously described engine 30.

Modifications

Although multiple embodiments of the invention have been illustrated in the accompanying drawings and described in the foregoing Detailed Description, it will be understood that the invention is not limited to the embodiments disclosed, but is capable of numerous rearrangements, modifications and substitutions without departing from the scope of the invention.

What I claim is:

1. An electrically powered fan engine for generating thrust by driving a stream of air which is produced by rotation of a fan, the engine comprising:
   an elongate housing having an air inlet at a forward end thereof and an air exhaust at a rearward end thereof, wherein said stream of air passes through said elongate housing,
   said fan mounted on a shaft which is located axially within said housing, said fan having a plurality of blades extending outward from said shaft and said fan positioned proximate a forward portion of said housing,
   a cylindrical rotor mounted to said blades of said fan wherein at least a portion of each of said blades is located between said rotor and said shaft,
   a cylindrical stator mounted to said housing proximate said air inlet and adjacent to said rotor wherein said rotor and said stator function together as an electric motor to drive said fan rotationally relative to said housing to cause said fan to produce said stream of air and thereby generate said thrust by said engine,
   a battery assembly mounted within said housing and having openings therein for receiving and passing through said battery assembly a majority of the air in said stream of air, wherein said stream of air produced by said fan passes sequentially through said battery assembly and through said air exhaust, and
   electrical conductors which connect said battery assembly to said electric motor for providing electrical power from said battery assembly to said electric motor.

2. An electrically powered fan engine as recited in claim 1 wherein said battery assembly is cylindrical and said battery assembly is positioned coaxially with said shaft.

3. An electrically powered fan engine as recited in claim 1 wherein said battery assembly comprises a plurality of metal/air battery cells each having a cylindrical anode, a cylindrical cathode, at least one insulating spacer between said anode and said cathode, wherein said anode, said cathode and said spacer form an annular chamber for holding an electrolyte for said battery cell.

4. An electrically powered fan engine as recited in claim 1 including air inlet ducts located adjacent said rotor for receiving air which is transferred across said rotor and said stator for cooling said rotor and said stator.

5. An electrically powered fan engine as recited in claim 3 including an electrolyte reservoir connected via conduits to transfer electrolyte to said battery cells.

6. An electrically powered fan engine as recited in claim 1 wherein said fan includes blades which extend outward beyond said rotor for producing an airflow substantially external to said housing.

7. An electrically powered fan engine as recited in claim 1 including an electrolyte reservoir and wherein said battery assembly has at least one electrolyte inlet connected via a conduit to said reservoir and said battery assembly has at least one electrolyte outlet connected via a conduit to said reservoir to permit the circulation of said electrolyte through said battery assembly and said reservoir.

8. An electrically powered fan engine as recited in claim 1 including a detachable nose cone mounted to said fan.

9. An electrically powered fan engine as recited in claim 1 wherein said battery assembly comprises a plurality of coaxial, adjacently spaced cylindrical battery cells connected electrically in series with said electric motor.

10. An electrically powered engine as recited in claim 1 including a cowling mounted to as a port of said housing and serving as an electrical conductor in an electrical circuit between said battery assembly and said electric motor.

11. An electrically powered fan engine for generating thrust by driving a stream of air which is produced by rotation of a fan, the engine comprising:
a cylindrical housing having an air inlet at a forward end thereof and an air exhaust at a rearward end thereof, wherein said stream of air passes through said cylindrical housing,
said fan mounted on a shaft which is located axially within said housing, said fan having a plurality of blades extending outward from said shaft and said fan positioned at said air inlet of said housing,
a cylindrical rotor mounted on the periphery of said blades of said fan wherein said rotor is positioned at least partially within the forward end of said housing,
a cylindrical stator mounted to said housing adjacent to sad rotor wherein said rotor and said stator function as an electric motor to drive said fan rotationally relative to said housing to cause said fan to produce said stream of air and thereby generate said thrust for said engine.
a battery assembly mounted within said housing, said battery assembly having a plurality of similar cylindrical battery cells electrically connected in series, each said battery cell coaxial with said housing, said battery cells having openings therein for receiving and passing through said battery cells a majority of the air in said stream of air, wherein said stream of air produced by said fan passes in a substantially unidirectional path through said battery assembly and through said air exhaust, and
electrical conductors which connect said battery assembly to said electric motor for providing electrical power from said battery assembly to said electric motor.

12. An electrically powered fan engine as recited in claim 11 including:
an elongate electrolyte reservoir mounted coaxially within said housing and coaxially within said battery assembly and
a pump for recirculating said electrolyte between said battery assembly and said reservoir.

13. An electrically powered fan engine as recited in claim 11 including a plurality of elongate bolts extending through said battery cells for clamping said battery cells together.

14. An electrically powered fan engine as recited in claim 12 including air vents forward of said electric motor for capturing air and directing said captured air across said rotor and stator for cooling said rotor and stator.

15. A method for generating thrust by an electrically powered fan engine, comprising the steps of:
generating electric power by operation of a metal/air battery assembly mounted within an elongate housing of said engine, said housing having an air inlet at a forward end thereof and an air exhaust at a rearward end thereof,
transferring said electric power through electrical conductors to an electric motor which comprises a stator mounted to said housing and a rotor,
rotationally driving a fan having a plurality of blades by operation of said electric motor wherein said rotor is mounted to the blades of said fan and said fan is positioned at a forward portion of said housing,
producing a stream of air by the rotation of said fan wherein said stream of air flows along a substantially unidirectional path through said air inlet, predominately through said battery assembly and out through said air exhaust of said housing, and
wherein the action of said fan in driving said stream of air produces said thrust by said engine.

16. A method for generating thrust for an electrically powered fan engine as recite din claim 15 including the step of circulating an electrolyte between a reservoir mounted within said housing and said metal/air battery assembly.

* * * * *

UNITED STATES PATENT AND TRADEMARK OFFICE
CERTIFICATE OF CORRECTION

PATENT NO. : 5,183,222
DATED : February 2, 1993
INVENTOR(S) : Ramsey, Jr.

It is certified that error appears in the above-identified patent and that said Letters Patent is hereby corrected as shown below:

Abstract, line 8, please delete "of the battery assembly." and substitute therefor -- of this air flow being directed through the interior of the battery assembly."

Col. 2, line 12, please delete "engine 30 in" and substitute therefor -- engine 30 shown in --.

Col. 2, line 27, please delete "is an detail" and substitute therefor -- is a detail --.

Col. 2, line 27, please delete "of a outer cell" and substitute therefor -- of an outer cell --.

Col. 2, line 29, please delete "FIG. 1" and substitute therefor -- FIG. 11 --.

Col. 3, line 68, please delete "turbine chamber 110" and substitute therefor -- turbine chamber 180 --.

Col. 11, line 62, please delete "sad" and substitute therefor -- said --.

UNITED STATES PATENT AND TRADEMARK OFFICE
CERTIFICATE OF CORRECTION

PATENT NO. : 5,183,222
DATED : February 2, 1993
INVENTOR(S) : Ramsey, Jr.

It is certified that error appears in the above-identified patent and that said Letters Patent is hereby corrected as shown below:

Col. 12, line 24, please delete "recirculating" and substitute therefor -- circulating --.

Col. 12, line 53, please delete "predominately" and substitute therefor -- predominantly --.

Col. 12, line 58, please delete "recite din" and substitute therefor -- recited in --.

Signed and Sealed this

Seventh Day of December, 1993

Attest:

BRUCE LEHMAN

Attesting Officer    Commissioner of Patents and Trademarks